United States Patent [19]

D'Angiolillo

[11] 4,310,826
[45] Jan. 12, 1982

[54] TIRE PRESSURE MONITORING SYSTEM

[76] Inventor: Louis D'Angiolillo, 11 Wyandotte La., East Islip, N.Y. 11730

[21] Appl. No.: 157,472

[22] Filed: Jun. 9, 1980

[51] Int. Cl.³ .............................................. B60C 23/02
[52] U.S. Cl. .................................... 340/58; 200/61.25
[58] Field of Search ............. 340/58; 200/61.25, 61.22

[56] References Cited

U.S. PATENT DOCUMENTS

| | | | |
|---|---|---|---|
| 2,794,876 | 6/1957 | Phelps | 340/58 |
| 2,966,650 | 12/1960 | Earnest | 340/58 |
| 3,162,835 | 12/1964 | Dudar | 340/58 |
| 3,675,198 | 7/1972 | Drown | 340/58 |

*Primary Examiner*—Alvin H. Waring
*Attorney, Agent, or Firm*—Edward H. Loveman

[57] ABSTRACT

Pressure actuated monitoring means for a vehicle having wheels carrying tubeless tires, includes pressure sensors mountable on each wheel. Each sensor has a housing receiving direct pressure of air from the interior of a tire. A flexible member in the housing moves in response to air pressure in the tire when the pressure falls below a critical predetermined magnitude. A switch on the housing has contacts which open and close in response to movements of the flexible member. The sensor is adjustable to respond to pressure of any predetermined magnitude. The monitoring means includes axles connected to the driving wheels. The axles carry slip rings continuously wiped by wiper arms carried by stationary axle housings. Alarm lamps are connected in circuit with the wiper arms. The monitoring means may also include spindles carrying freely rotatable wheels. Fixed spaced contact rings on the spindles are wiped by continuously rotating wiper arms carried by the wheels on the spindles. Other alarm lamps are connected in circuit with the contact rings. Quickly detachable electric conductors connect all sensors with the slip rings and the rotating wiper arms.

5 Claims, 7 Drawing Figures

TIRE PRESSURE MONITORING SYSTEM

This invention relates to air pressure indicator systems for vehicles employing tubeless tires, and more particularly concerns such a pressure indicator system which is independent of the valves and valve stems of the tires in the vehicle.

The need and desirability of a pressure indicator for continuously monitoring the pressure in a vehicle tire has been generally recognized. Numerous devices and systems have been proposed to meet this need, such as those described in U.S. Pat. Nos. 3,222,641; 3,398,398; 3,938,078; 3,987,407; 4,159,465. The prior pressure monitoring devices and systems have one important disadvantage which has not been generally recognized. They are all in direct fluid communication with the interior of the tire through the standard vavle and valve stem. If the valve becomes damaged, worn, or inoperative, or the valve stem becomes clogged, as often happens, the pressure monitoring device is rendered inoperative or its operation becomes impaired or unreliable. Other disadvantages of the prior tire pressure monitoring systems are their complexity, high cost, and difficulty of installation. Some prior systems are objectionable because they require disassembly when a wheel is to be removed from a vehicle for rotation of tires, repairing tire leaks, and other vehicle or tire servicing. In addition some systems interfere with inflation of the tire through its valve stem because the valve stem is part of the pressure monitoring device.

The present invention is directed at overcoming the above and other difficulties and disadvantages of the prior tire pressure monitoring devices and systems, by providing an improved, simplified, less expensive, completely reliable pressure indicating system which monitors the air pressure in all vehicle tires, separate and apart from the tire valves and valve stems.

It is intended that the system embodying the invention be incorporated in a vehicle and its wheels as original equipment installed at the factory, or as an accessory to be installed after the vehicle is manufactured. If the system is manufactured at the factory, it may be installed to precise factory specifications under standardized quality control conditions and engineering supervision. Installation of the system as original vehicle equipment minimizes the cost of manufacture and its ultimate cost to the consumer.

According to the invention the system includes an adjustable air pressure sensor for each tire. The sensor has a switch attached to a housing screwed into the wheel on which a tubeless tire is mounted, and is located just below the rim of the wheel. A flashing warning lamp for each tire is mounted at the instrument panel of the vehicle. Each lamp is connected in a direct electrical circuit with the switch on the vehicle wheel carrying the tire whose air pressure is monitored. The electrical circuits include wires passing through the spindles and axles carrying the vehicle wheels. Appropriate feeler or contact rings and wiper arms located at rotating parts maintain continuity in the direct electrical circuits. Such direct electrical circuits simplify the system, minimize the cost of manufacture and installation, and insure reliable operation.

In operation the tire pressure monitoring and indicating system warns the driver of a vehicle, whether stationary or in motion by a flashing lamp that a particular tire, including a spare tire, has lost air pressure below a safe minimum level, allowing the driver time and opportunity to check the tire pressure and inflate the tire or repair it because a dangerous or unsafe condition has developed.

It is therefore a principal object of the present invention to provide a wheeled vehicle with a tire pressure monitoring system with sensors at each wheel independent of the tire valve.

Another object of the present invention is to provide a tire pressure monitoring system of the type described which includes means for continuously indicating at the instrument panel board of the vehicle the condition of each tire on the vehicle.

These and other objects and many of the attendant advantages of this invention will be readily appreciated as the same becomes better understood by reference to the following detailed description when considered in connection with the accompanying drawings in which.

Figure 1:
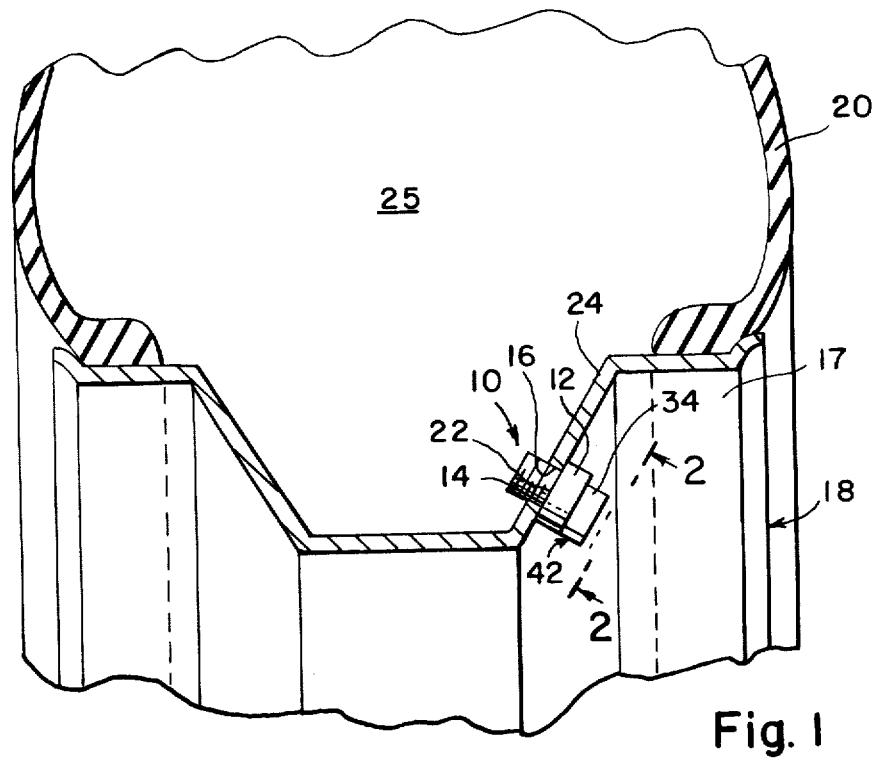
FIG. 1 is a fragmentary sectional view through a tire and wheel, showing a tire pressure monitoring device, according to the invention, mounted on the wheel.
Figure 2:
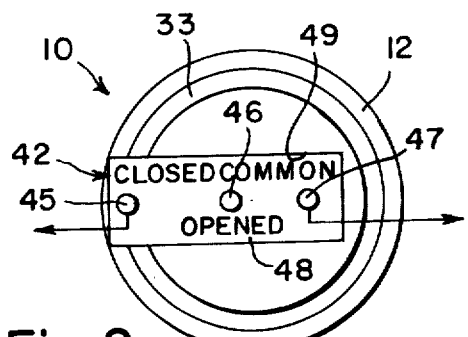
FIG. 2 is an enlarged end view of the tire pressure monitoring device per se, taken along line 2—2 of FIG. 1.
Figure 3:
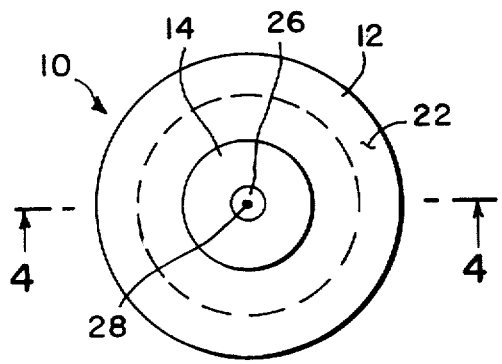
FIG. 3 is a rear end view of the tire pressure monitoring device.

Referring now to the drawings wherein like reference characters designate like or corresponding parts throughout, there is illustrated in FIGS. 1, 2, 3, and 4, a pressure sensing device or sensor generally designated as reference numeral 10 having generally cylindrical housing 12 formed with a threaded nipple 14 adapted to be screwed into a threaded hole 16 near a rim 17 of a wheel 18 on which is mounted a conventional air inflated tubeless tire 20. An annular shoulder 22 of the housing 12 abuts the outer side of an annular flange 24 of the wheel 18, while nipple 14 extends into an air chamber 25 and is in direct communication therewith. It will be noted that the conventional valve and valve stem (not shown) of the tire are separate and apart from and independent of the sensor device 10.

Figure 4:
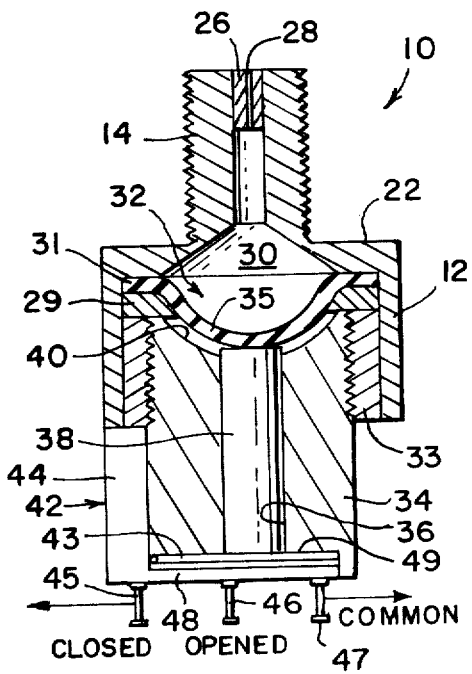
FIG. 4 is an axial sectional view of the device taken along line 4—4 of FIG. 3.

Inside the nipple 14 is a small cylindrical plug 26 having a narrow axial passage 28 for bleeding air from the chamber 25 into the interior of the housing 12; see FIG. 4. The passage 28 in the nipple 14 communicates with a chamber 30 inside the housing 12. An annular elastic diaphragm 32 extends diametrally across the chamber 30. The rim 31 of the diaphragm is secured by a ring 29 held by an internally threaded bushing 33 which is force-fitted into the housing 12, and in axial alignment therewith. A cylindrical body 34 having a threaded end is screwed into the bushing 33 whereby both body 34 and bushing 33 holds ring 29 in place. Inside the body 34 is an axial bore 36 in which is inserted an axially movable cylindrical core 38 which extends out of the bore 36 at one end, into the chamber 30 under the diaphragm 32. The body 34 is formed at its inside end with a concavity 40 which receives the flexible central portion 35 of the diaphragm 32.

A microswitch 42 of conventional type is secured to the body 34. The switch 42 has a spring biased lever 43 hinged to a switch body 44. The lever 43 is contacted and actuated by a core 38. The switch 42 has a closed contact terminating in a lug 45, an open contact terminating in a lug 46, and a common contact terminal lug 47. The lugs 45, 46, and 47 are carried by an end plate or bar 48 of the microswitch 42. The bar 48 is seated in a groove 49 formed in the end of the body 34.

One sensor device 10 is provided for each wheel of the vehicle including the wheel carrying a spare tire. The sensor devices 10 are electrically connected in electrical circuits shown in FIG. 7 and explained below. The sensor devices are connected via fixed and rotating spindle and axle assemblies which carry the wheels of the vehicle.

Figure 5:
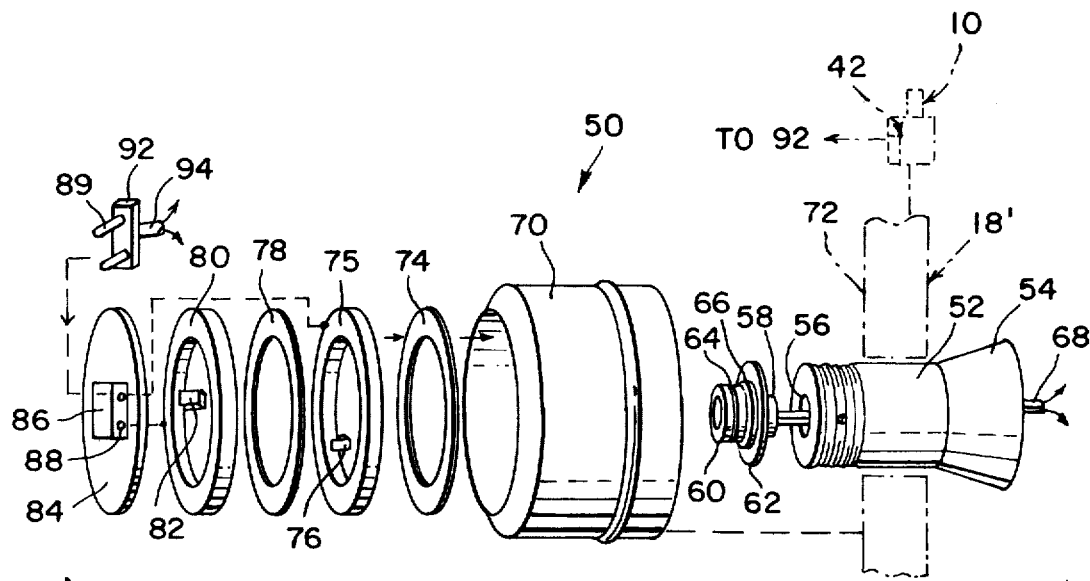
FIG. 5 is an exploded partially schematic perspective view of a spindle assembly for supporting a freely rotatable wheel on a vehicle, adapted to form part of the tire pressure monitoring and indicating system.

Referring now to FIG. 5, there is shown a wheel mounting assembly generally designated as reference numeral 50, adapted for use with the sensor device 10. The assembly 50 will carry a freely rotatable, undriven wheel 18' equipped with the sensor device 10 and has a cylindrical spindle 52 formed with a flared end 54 adapted to be secured rigidly and nonrotatably to the chasis of a vehicle. The spindle 52 has a central bore 56 in which is inserted a cylindrical end 58 of an insulator bushing 60. The bushing 60 is provided with an annular flange 62 which abuts the outer end of the spindle 52. The bushing 60 carries two axially spaced stationary electrical contact rings 64, 66 which are connected in circuit with an insulated wire 68 extending through the bore 56 in the spindle 52 and terminating at an alarm circuit C1 or C2 shown in FIG. 7.

A cylindrical cap 70 mounts on a disc 72 of the wheel 18' and rotates with the wheel. Inside of the cap 70 is snugly fitted an annular insulator 74. Abutting the insulator 74 is a feeler ring 75 having a wiper arm 76 which wipes around the contact ring 66 as the feeler ring 75 rotates with the wheel 18'. Abutting the feeler ring 75 is an annular insulator 78. Centrally aligned with the insulators 74 and 78 and laterally abutting the insulator 78 is another feeler ring 80 carrying a wiper arm 82 which wipes around the contact ring 64 as the feeler ring 80 rotates with the wheel 18' of the vehicle. Abutting the ring 80 is a cover plate 84 which closes the cap 70. A plate 84 carries a connector block 86 which has socket terminals 88 to engage a pair of plug contacts 89 of another connector block 92 connected by wires 94 to the closed terminal 45 and the common terminal 47 of the microswitch 42 on the associated sensor 10 illustrated in FIG. 4.

Figure 6:
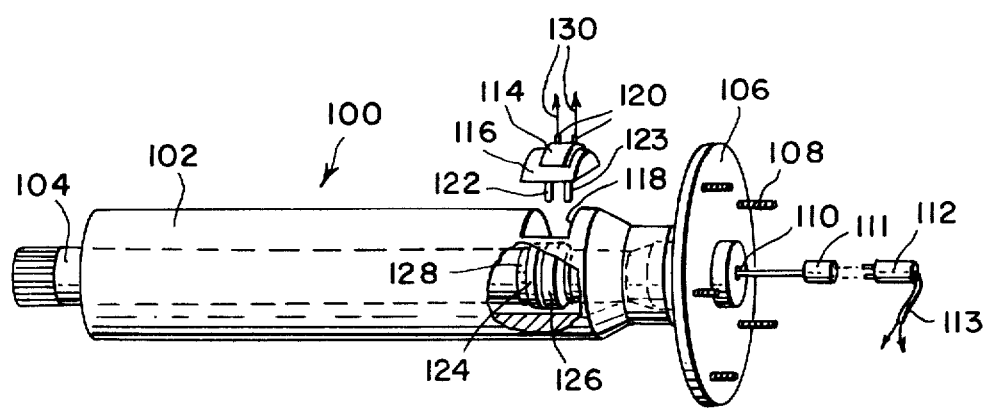
FIG. 6 is an isometric view of an axle assembly for driving a wheel on the axle with parts broken away to show internal structure, the axle assembly being adapted to form part of the system embodying the invention.

FIG. 6 shows a wheel mounting assembly generally designated as reference numeral 100 adapted for use with the sensor device 10 housing 102 carries an axle 104 which is driven by a differential gearing (not shown) of the vehicle. A disc 106 at the outer end of the axle 104 carries one of the driven wheels of the vehicle. Bolts 108 are used to mount the wheel on a rotatable driven disc 106. A hole 110 in the axle 104 receives a connector block 111 having terminal sockets to which a mating plug 112 may be connected. Wires 113 terminate at the microswitch 42 on the sensor 10, shown in FIG. 4.

An insulator block 114 mounted on a cover plate 116 can be secured in a cavity 118 in the axle housing 102.

Two terminal lugs 120 on the insulator block 114 are internally connected to respective wiper arms 122, 123 which extend inwardly and contact respectively axially spaced conductive slip rings 124, 126 on an insulated sleeve 128 mounted on the axle 104. A pair of wires 130 are respectively connected to the lugs 120 which are in turn connected in circuit with a warning lamp in circuit C3 shown in FIG. 7.

Figure 7:
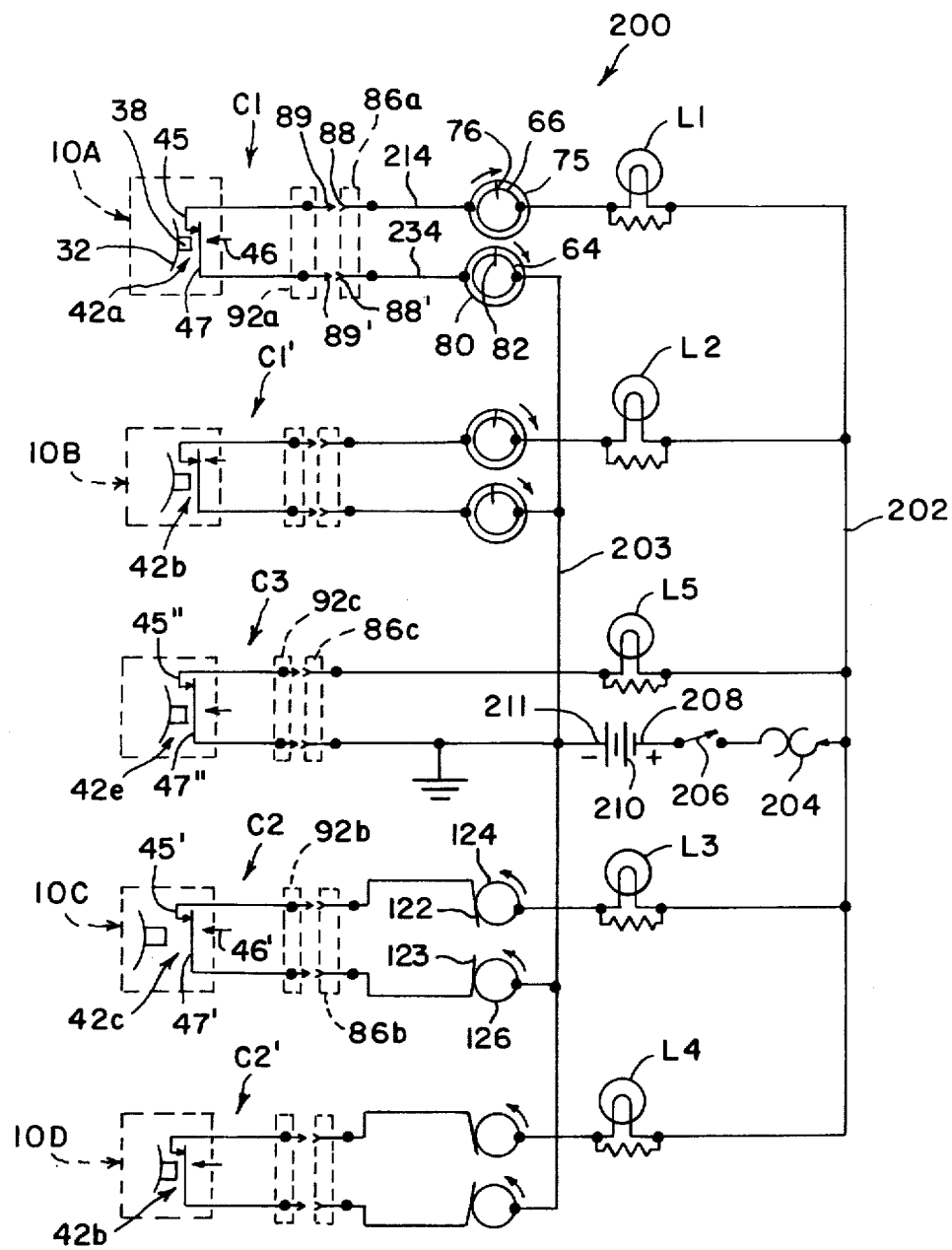
FIG. 7 is a schematic electrical circuit diagram of the system embodying the invention.

Circuit 200 illustrated in FIG. 7 includes five alarm circuits C1, C1', C2, C2', and C3 connected in parallel to a pair of line wires 202 and 203. The wire 202 is connected via a flasher switch or cyclical circuit interrupter 204 and an ignition switch 206 to one terminal 208 of a battery 210. The other terminal 211 of the battery 210 is connected to the line wire 203 which may be grounded to the chassis of the vehicle. The circuits C1 and C1' are employed with freely rotatable wheels at the front or rear of the vehicle. The circuits C2 and C2' are employed with driven wheels at the rear or front of the vehicle. The circuit C3 is employed with a wheel designated as a spare tire.

Circuit C1 includes a warning lamp L1 connected between the line wire 202 and the contact ring 66. The wiper arm 76 on the ring 75 is connected via a wire 214 to the socket 88 of a connector 86a. The pin 89 of a connector 92a fits into a socket 88. The pin 89 is connected to closed contact 45 of a microswitch 42a on a sensor 10A. The common contact 47 is connected to the pin 89' of the connector 92a. The open contact 46 is unconnected. The pin 89' is inserted into socket 88' of the connector 86a. The socket 88' is connected by a wire 234 to the ring 80 carrying the rotatable wiper arm 82 which wipes the contact ring 64. The ring 64 is connected to the common ground wire 203 to complete the alarm circuit to one of the sensors i.e. 10A. The sensor 10A includes the diaphragm 32 and the movable core 38 which opens the contacts 45, 47 when the associated tire is at or above a certain predetermined critical pressure, to open the alarm circuit C1. Closing of the contacts 45, 47 activates the alarm circuit C1, completing the circuit of lamp L1 to light this alarm or warning lamp.

Circuit C1', used with a freely rotatable wheel, is identical to the circuit C1 and corresponding parts are connected to lamp L2 and a microswitch 42b of a sensor 10B.

Circuit C2, used with a driven wheel on an axle, has a sensor 10C provided with a microswitch 42c. The closed contacts 45', 46', 47' are connected to pins of a connector 92b inserted into sockets of a connector 86b. These sockets are connected to respective wiper arms 122, 123 and wipe respective rotatable slip rings 124, 126. A warning lamp L3 is connected to the slip ring 124. The slip ring 126 is connected to the ground wire 203. The battery 210, the ignition switch 206 and the flasher switch 204 are connected in a series circuit between the wires 202 and 203. As in circuit C1, the contacts 45', 47' are opened when the tire pressure sensed by the sensor 10C is above a predetermined critical pressure and the contacts close when the pressure falls below the predetermined critical pressure, to light the lamp L3.

Circuit C2', used with a driven wheel on an axle, is identical to the circuit C2 and has its own alarm or warning lamp L4 in circuit with a microswitch 42d of a pressure sensor 10D.

Circuit C3 used with a wheel carrying a spare tire and stored in or on the vehicle, has an alarm or warning lamp L5 connected at one terminal to the wire 202 in series with the flasher switch 204, the switch 206 and the battery 210. The other terminal of the lamp L5 is connected to closed contacts 45", 47" of a microswitch 42e in series with the pins and sockets of connectors 92c, 86c, and a terminal 211 of the battery 210, to complete the alarm circuit C3.

If the vehicle has four-wheel drive, then the four axle mounted wheels will emply alarm circuits like circuits C2, C2'. Circits C1, C1' will not be used, but the spare tire alarm circuit C3 will be used.

In operation of the system, each tire is inflated through its valve and the sensor 10 is adjusted to respond to predetermined pressures (hereinbefore referred to as "predetermined critical pressure"). For example, suppose a tire has a specified minimum safe driving pressure of 24 lbs. per square inch. Air in the tire will bleed through the passage 28 and expand the diaphragm 32 (see FIG. 4). The position of the body 34 will be adjusted so that the diaphragm 32 depressed the core or plunger 38 to close the contacts 45, 47 when the air pressure in the tire is at the predetermined critical pressure. The sensor may then be environmentally sealed by a conventional epoxy or silicone compound. The tire can then be further inflated above this critical pressure to normal driving pressure, 30 lbs. per square inch, for example. If the pressure subsequently falls below the critical pressure due to a puncture of tire, a leaky stem or valve, separation of bead from the rim of the wheel, or other cause, the contacts 45, 47 will close and the alarm or the warning lamp will light.

Circuits C1 and C1' which will be used with the assembly 50 such as shown in FIG. 5 for carrying a freely rotatable wheel, complete their circuit through the rotating wiper arms 76, 82 wiping the fixed contact rings 64, when the ignition switch 206 is closed. Circuits C2 and C2' used with the assembly 100 as shown in FIG. 6 for a driven wheel complete their circuits through the wiper arms 122, 123 and the slip rings 124, 126 when the ignition switch 206 is closed.

It is preferable that the critical operating pressure for the sensor 10 be set within 1 lb. of the manufacturer's suggested normal operating pressure for the associated tire. This will insure that the driver is kept alerted to the pressure condition of the tire at all times, and can correct any excessive fall in pressure.

When a system is properly installed, adjusted and operated, the following desirable results are obtained:
1. Longer wear of tires.
2. Improved ride.
3. Better traction.
4. Better mileage.
5. More braking power.
6. Reduction in repairs.
7. Safer driving.

The system has the important advantage that a tire can be put on and taken off a wheel without disturbing the sensor 10. Furthermore the system is independent of the tire valves and stems so that these tires can be inflated without interference by the pressure monitoring system. Tires can be rotated and interchanged without disturbing the sensors. Once adjusted for a certain critical operating pressure, they need not be adjusted again. It should be understood that although the system has been described as operating a warning lamp, it may be obviously used to operate an audible alarm.

The system described can be installed as original equipment when the automotive vehicle is manufactured. This will minimize cost in manufacture and installation and will insure that factory standards and specifications are observed.

It should be understood that the foregoing relates to only a preferred embodiment of the invention which has been by way of example only, and that it is intended to cover all changes and modifications of the example of the invention herein chosen for the purposes of the disclosure, which do not constitute departures from the spirit and scope of the invention.

What is claimed is:

1. Tire pressure monitoring system for a vehicle having wheels each of which carry a tubeless tire mounted on a rim thereof with a valve on each of said tubeless tires for filling said tire with compressed air, each of said wheels having a threaded hole near said rim, said pressure monitoring system comprising:
   a housing having a threaded nipple at one end and an annual shoulder, said housing being threaded on one of said wheels through said threaded hole therein so that said annual flange abuts said wheel;
   said housing having a passage communicating with the interior of said housing and enabling direct flow of air between the interior of said housing and the interior of said tubeless tire on said wheel;
   a diaphragm means extending diametrically across said passage in said housing and a cylindrical core having one end abutting said diaphragm and movable in response to air pressure in said tire;
   an electric switch mounted on said housing and abutting the other end of said core;
   said switch having switch contacts opening and closing in response to movements of said core in said housing;
   a spindle mountable in a fixed horizontal position on said vehicle for carrying said wheel in freely rotatable axially horizontal position;
   a first insulated member carrying fixed electrically conductive, spaced contact rings, mounted in fixed position on said spindle;
   first electric conductors connected to said rings and extending axially through said spindle;
   second and third insulated members mountable on said wheel to rotate therewith;
   electrically conductive wiper arms carried by said second and third insulated members respectively disposed to wipe said contact rings continuously when said wheel rotates; and
   quickly disconnectable second electric conductors directly connecting said wiper arms to said switch contacts for conducting electric current through said first electric conductors when said switch contacts close.

2. Tire pressure monitoring system as defined in claim 1, further comprising alarm means in circuit with said first electric conductors for indicating when said air pressure rises above and falls below said predetermined magnitude.

3. Tire pressure monitoring system as defined in claim 1, further comprising:
   an axle housing mountable in fixed position on said vehicle;
   an axle rotatably carried by said axle housing arranged to mount said wheel thereon for rotation with said axle;
   first insulated means carrying spaced electrically conductive slip ring, mounted on said axle and rotatable therewith;

second insulated means mounted on said axle housing and carrying spaced, electrically conductive wiper arms arranged to wipe said slip rings continuously when said wheel and axle rotate; and quickly disconnectable electric conductors connected in direct electric circuit between said slip rings and said switch contacts, for conducting electric current through said wiper arms when said switch contacts close.

4. Tire pressure monitoring system as defined in claim 3, further comprising alarm means in circuit with said wiper arms for indicating when said air pressure rises above and falls below said predetermined magnitude.

5. Tire pressure monitoring system as defined in claim 4, further including a battery for energizing said alarm means, and flasher switch means in circuit with said battery and said alarm means for cyclically interrupting said circuit when said alarm means is energized.

* * * * *